United States Patent Office 2,858,293
Patented Oct. 28, 1958

2,858,293
CHLOROETHYLENE POLYMERS STABILIZED WITH B-RESORCYLIC ACID DIESTERS

Gerald A. Clark, Midland, Carl B. Havens, Hope, and Ronald G. Brookens, Auburn, Mich., assignors to The Dow Chemical Company, Midland, Mich., a corporation of Delaware No Drawing. Application August 2, 1956
Serial No. 601,651

4 Claims. (Cl. 260—45.85)

This invention relates to new and improved thermoplastic compositions. More particularly it relates to polymeric compositions having improved stability to the degradative effects of sunlight.

Thermoplastic compositions, particularly those prepared from haloethylene polymers have found wide acceptance as useful materials for making foils, films, fibers, filaments and other articles. The articles so produced are inherently strong, dimensionally stable, relatively inert to common household solvents, and are easily colored for an attractive appearance. However, such articles are subject to rapid and severe degradation as evidenced by discoloration due to the effects of light. The problem becomes most serious when polymeric compositions are employed in filamentary articles in making window curtains, automobile seat covers, and other articles which are exposed for prolonged periods of time to direct sunlight. To overcome this disadvantage it has become commonplace to incorporate certain additives into the composition to stabilize it to the effects of light. Some of the prior light stabilizing materials have suffered from the disadvantages of bleeding out of articles fabricated from haloethylene polymers. Some of the materials are colored so that they impart an objectionable initial color preventing the preparation of white articles. Further, many of the prior materials lost their effectiveness as light stabilizers after exposure to sunlight for a short time. Still further the light stabilizers should be odorless, tasteless, non-toxic, non-volatile, and chemically inert to the polymer and additives forming the composition. In view of the many requirements and desirable characteristics of light stabilizers, it is impossible to predict the effectiveness of any given material as a light stabilizer.

It is accordingly an object of this invention to provide improved polymeric compositions having increased resistance to the degradative effects of light.

It is a particular object to provide such a composition which is based on a haloethylene polymer and is resistant to discoloration over prolonged periods of exposure to direct sunlight.

The above and related objects are accomplished with a polymeric composition comprising a thermoplastic material together with stabilizing quantities of an ester falling within the scope of the general formula:

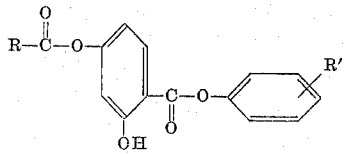

wherein R is selected from the group consisting of aryl, substituted aryl, and alkyl having from 1 to 7 carbon atoms and R' is selected from the group consisting of hydrogen, halogen, aryl, and alkyl having from 1 to 8 carbon atoms.

The esters are easily prepared by conventional esterification or by direct esterification methods. In an illustrative preparation, 1.0 mole of beta-resorcylic acid: phenyl ester and 1.1 moles of phenyl salicylate were heated together at a pressure of 20 to 40 millimeters mercury, collecting the phenol liberated from esterification. When one mole of phenol was collected, the reaction mass was cooled and the mixture stirred into hot alcohol, filtered and dried. The 4-(2-hydroxybenzoxy)salicylic acid:phenyl ester was a white solid melting at 300° C. Other esters within the scope of the above general formula may be prepared by choosing the corresponding salicylates and acid chlorides and conducting the reaction in solvents, such as toluene, in the presence of the usual esterification catalysts, such as pyridine.

Although a wide variety of thermoplastic materials may be stabilized in accordance with this invention, particularly advantageous results are obtained with haloethylene polymers, such as the polymers of vinyl chloride, the copolymers of vinyl chloride and vinylidene chloride, and the copolymers of vinylidene chloride with other copolymerizable monomers wherein the vinylidene chloride is present in an amount of at least 50 percent. Those haloethylene polymers are accordingly preferred in preparing the compositions. Haloethylene polymers present a difficult and unusual problem in that once degradation or discoloration has started the effect seems to be autocatalytic or at least accelerated.

The diesters of this invention are employed in a concentration of from 1 to 10 percent, preferably 2 to 5 percent, by weight based on the weight of the polymer. When less than 1 percent is used the compositions exhibit little more stability than unstabilized compositions. When more than 10 percent is employed no additional benefits result, the compositions are more costly to produce, and the physical properties, such as tensile strength of the composition based on the polymer may suffer.

The diesters of this invention are white, easily prepared, insoluble in aqueous alkali, and are non-volatile and consequently are excellent stabilizing materials for haloethylene polymers.

Most polymeric compositions comprise many ingredients such as plasticizers, fillers, pigments, and heat stabilizers, and the organic ester derivatives of this invention may be employed in the compositions in conjunction with such additives without any adverse effects. Likewise the derivatives of this invention may be used cooperatively with other known light stabilizers, such as Salol.

The ingredients may be intermixed prior to fabrication either sequentially or simultaneously by known blending methods.

The advantages of the esters of this invention will be more apparent from the following example wherein all parts and percentages are by weight.

EXAMPLE

Sample compositions were formulated from 91.5 parts of a polymer prepared from 85 percent vinylidene chloride and 15 percent vinyl chloride, 7 parts of an ester of pentaerthritol sold commercially as J-15 by the Hercules Powder Co. as a plasticizer, 0.5 part of sodium tripolyphosphate and 0.5 part disodium lauryl phosphate as heat stabilizers, and 0.5 part of a lubricant. One of the compositions was left unstabilized as a blank, one had 2 percent of phenyl salicylate added for comparison, and the third composition was stabilized with 4 percent of 4-(2-hydroxybenzoxy)salicylic acid:phenyl ester. The compositions were extruded into monofilaments having a diameter of 0.01 inch and exposed to direct sunlight in the State of Arizona. The useful life of the monofilaments was determined by the number of ultra-violet sun hours required to reach a standard browning. The results are listed in Table I.

Table I

| Stabilizer: | Useful life (ultra-violet sun hours) |
|---|---|
| None | 250 |
| Phenyl salicylate | 750 |
| 4-(2-hydroxybenzoxy)salicylic acid:phenyl ester | 1000 |

The composition stabilized with an ester of this invention is considerably more stable than a composition stabilized with a commercially used stabilizer.

We claim:

1. A light stable composition of matter comprising a chloroethylene polymer normally subject to discoloration on exposure to light and from 1 to 10 percent by weight based on the weight of said material of an ester falling within the scope of the general formula:

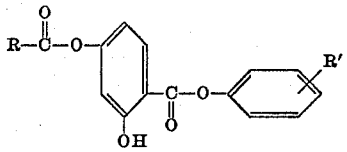

wherein R is selected from the group consisting of aryl, substituted aryl, and alkyl having from 1 to 7 carbon atoms, and R' is selected from the group consisting of hydrogen, halogen, aryl, and alkyl having from 1 to 8 carbon atoms.

2. The composition claimed in claim 1, wherein said chloroethylene polymer is a copolymer composed of at least 50 percent by weight of vinylidene chloride.

3. The composition claimed in claim 1, wherein said chloroethylene polymer is a copolymer of vinylidene chloride and vinyl chloride.

4. The composition claimed in claim 1, wherein said ester is 4-(2-hydroxybenzoxy)salicylic acid:phenyl ester.

References Cited in the file of this patent

UNITED STATES PATENTS

| 2,157,068 | Carruthers | May 2, 1939 |
| 2,464,250 | Moll et al. | Mar. 14, 1949 |